US008079719B2

(12) United States Patent
Miller et al.

(10) Patent No.: US 8,079,719 B2
(45) Date of Patent: Dec. 20, 2011

(54) MIRROR SCANNING SYSTEM

(75) Inventors: Warren H. Miller, Palm Bay, FL (US); Kenneth D. White, Cocoa, FL (US); Reeder N. Ward, Melbourne, FL (US)

(73) Assignee: Microsemi Corporation

( * ) Notice: Subject to any disclaimer, the term of this patent is extended or adjusted under 35 U.S.C. 154(b) by 971 days.

(21) Appl. No.: 12/043,246

(22) Filed: Mar. 6, 2008

(65) Prior Publication Data

US 2009/0225382 A1 Sep. 10, 2009

(51) Int. Cl.
*G02B 5/08* (2006.01)

(52) U.S. Cl. ........................................ 359/872; 248/652

(58) Field of Classification Search .... 359/198.1–199.4, 359/200.6–200.8, 202.1, 221.2, 223.1–225.1, 359/226.2, 290–295, 838, 846, 871, 872; 250/204, 559.06, 559.29, 230, 234; 248/637–681, 248/489, 494–496

See application file for complete search history.

(56) References Cited

U.S. PATENT DOCUMENTS

2005/0046979 A1* 3/2005 Hiley et al. .................. 359/877

* cited by examiner

*Primary Examiner* — Jennifer L. Doak

(74) *Attorney, Agent, or Firm* — Holland & Hart LLP

(57) ABSTRACT

The invention provides for an improved mirror scanning system for use with a millimeter wave imaging system. The mirror scanning system includes a pair of voice coil actuators aligned generally perpendicular to a mirror. The voice coils are intermittently energized pursuant to a predetermined frequency related to a desired resolution. A base supports a back plate that is generally disposed parallel to the mirror and secures the pair of voice coil actuators. A rod flexure is secured to a center yoke, or coil bobbin, of each of the respective voice coils and to a back side of the mirror so that the pair of rod flexures simultaneously exert a force on the mirror causing deflection thereon as the pair of voice coils are energized. Stationary position sensors are mounted adjacent to each cylinder so the sensor can determine to location of the cylinder, and hence the angle of the mirror.

10 Claims, 9 Drawing Sheets

100
110
120
160
120
130
150
140

MIRROR SCANNING SYSTEM

BACKGROUND OF THE INVENTION

1. Field of the Invention

The present invention relates generally to optical systems, and more specifically to an assembly that flexurally suspends a mirror to reflect millimeter wave energy to a radiometer.

2. Description of the Prior Art

Mirrors are often used in imaging systems to direct electromagnetic radiation for various applications such as lasers, x-rays, and thermal imaging. There are static type mirrors that are fixed permanently into position. This type of static system has been used with aircraft performing reconnaissance over a designated area. The mirror on the aircraft is fixed so that the aircraft is required to maneuver to focus the mirror on a larger area to complete a survey. This is a shortcoming in functionality that has been addressed with another type of mirror system that has the ability to be adjusted and rotated about an axis or axes.

Both aircraft and satellite cameras have used flexurally suspended mirrors for decades. They generally move about only one axis.

The scanning mechanism that is the subject of this invention uses a flexurally suspended mirror in a millimeter wave imaging system. A millimeter wave imaging system uses either active or passive detection and measurement of electromagnetic radiation at millimeter wavelengths. The contrast in radiation between the surrounding background environment and individual undergoing a scan identifies concealed objects under clothing.

In an adjustable mirror system, the mirror is used to scan the imaging zone and redirect millimeter wave energy to the focal plane of a lens. This reduces the required size of the radiometer. The mirror is mounted on a universal joint about two perpendicular axes. The universal joint provides the pivot point as actuators position the mirror as desired. However, this type of prior art system is not suited for scanning at a rapid rate. Furthermore, the universal joint is susceptible to failure and vibration as it becomes worn from use.

To overcome the failure of universal joints, the prior art describes an alternative mirror mount whereby a rod and flexible neck serve as a substitute for a universal joint to support the mirror. Actuators are used to tilt the mirror about the flexible neck and a diaphragm secures the mirror to the support body. However, a shortcoming of this type of system is the small field of scanning of less than 1 degree.

Accordingly, there is a need for a mirror scanning system that has the ability to scan a large field of view.

There is also a need in the art for an improved mirror scanning system that is accurate and not susceptible to wear of the assembly after normal operation.

It is, therefore, to the effective resolution of the aforementioned problems and shortcomings of the prior art that the present invention is directed.

However, in view of the prior art at the time the present invention was made, it was not obvious to those of ordinary skill in the pertinent art how the identified needs could be fulfilled.

SUMMARY OF THE INVENTION

The invention provides for a mirror scanning system with a mirror held substantially rigid in four degrees of freedom by two flexures, which permits rotation about the two remaining degrees of freedom. The mirror may be made of a honeycomb type material for lightness with rigidity. The system includes a pair of voice coil actuators aligned generally perpendicular to a mirror; a pair of corresponding cylinders secured to a center yoke, or moving coil bobbin, of each of the respective voice coil actuators; the pair of voice coil actuators having a circular flange disposed upon the periphery of the cylinders wherein the cylinders may be moved substantially axially by electrical current driven through the voice coil actuators by external amplifiers. Each cylinder is attached to a point on the mirror near its periphery by an actuator rod flexure, and drives the mirror to rotate about one of a pair of mutually perpendicular axes; and a base supporting a back plate generally disposed parallel to the mirror which mounts the voice coil actuators. The millimeter wave energy from an imaging zone is reflected by the mirror scanning system of the present invention to a radiometer. The millimeter wave energy is then processed to produce contrast-based images.

The specific embodiments described above provide an improved mirror scanning system that overcomes the limitations of the prior art.

A primary object of the invention is to provide lower fabrication costs of a mirror scanning system.

Another very important object of the invention is to provide a mirror scanning system that has the ability to scan a large field of view.

Still another important object of the invention is to provide an improved mirror scanning system that is accurate and not susceptible to wear of the assembly after normal operation.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
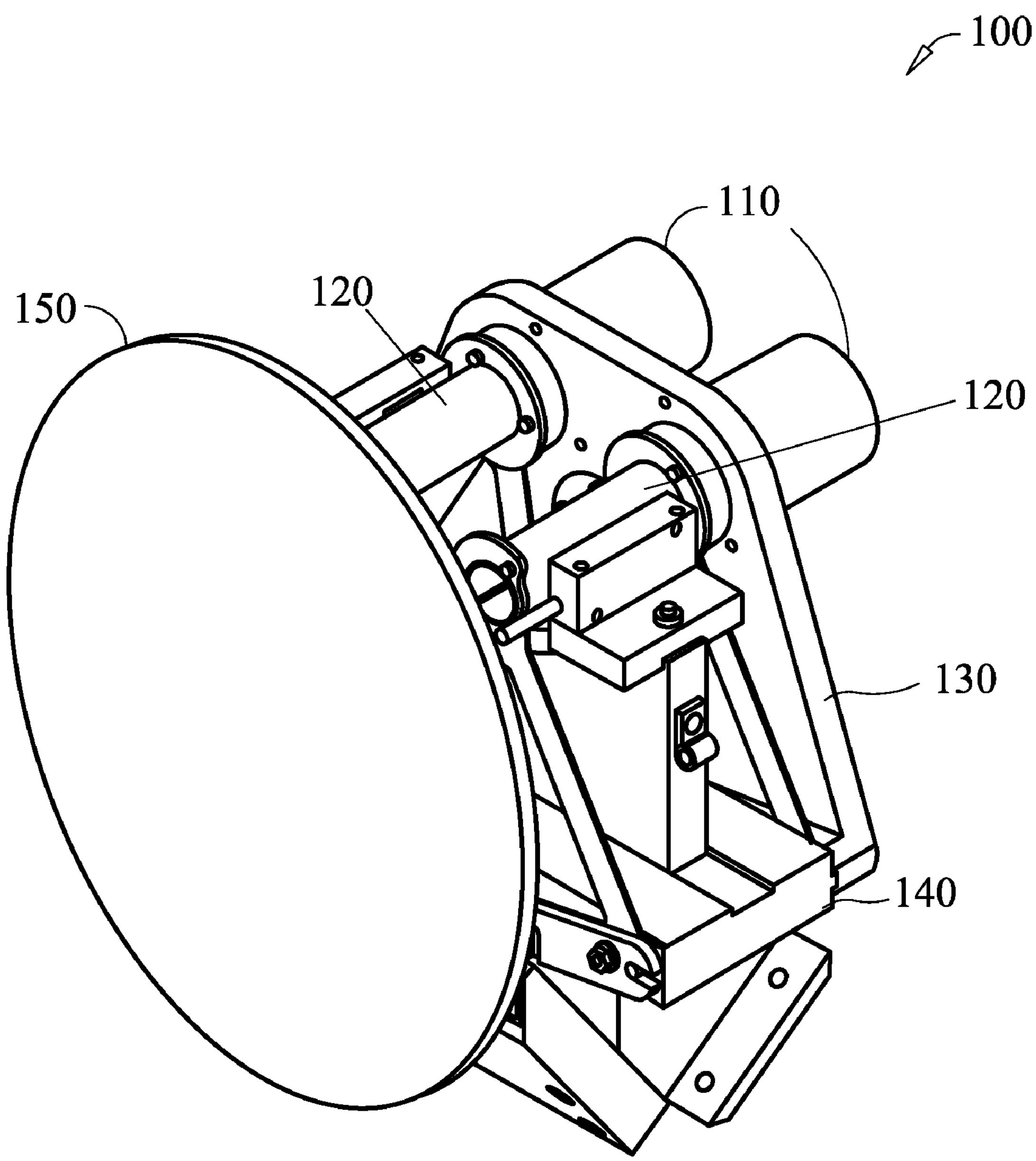
FIG. 1 is a right perspective view of an embodiment of the present invention.

Referring to FIG. 1, mirror scanning system 100 is shown in accordance with the present invention. A pair of voice coil actuators 110 are aligned generally perpendicular to mirror 150. A pair of corresponding cylinders 120 are secured to a center yoke of each of the respective voice coils of the pair of voice coil actuators 110 using a circular flange disposed upon the periphery of cylinders 120. Pair of cylinders 120 oscillate as voice coil actuators 110 are intermittently energized pursuant to a predetermined frequency related to a desired resolution. Base 140 provides the support for back plate 130 that secures pair of voice coil actuators 110 and is generally disposed parallel to mirror 150.

Figure 2:
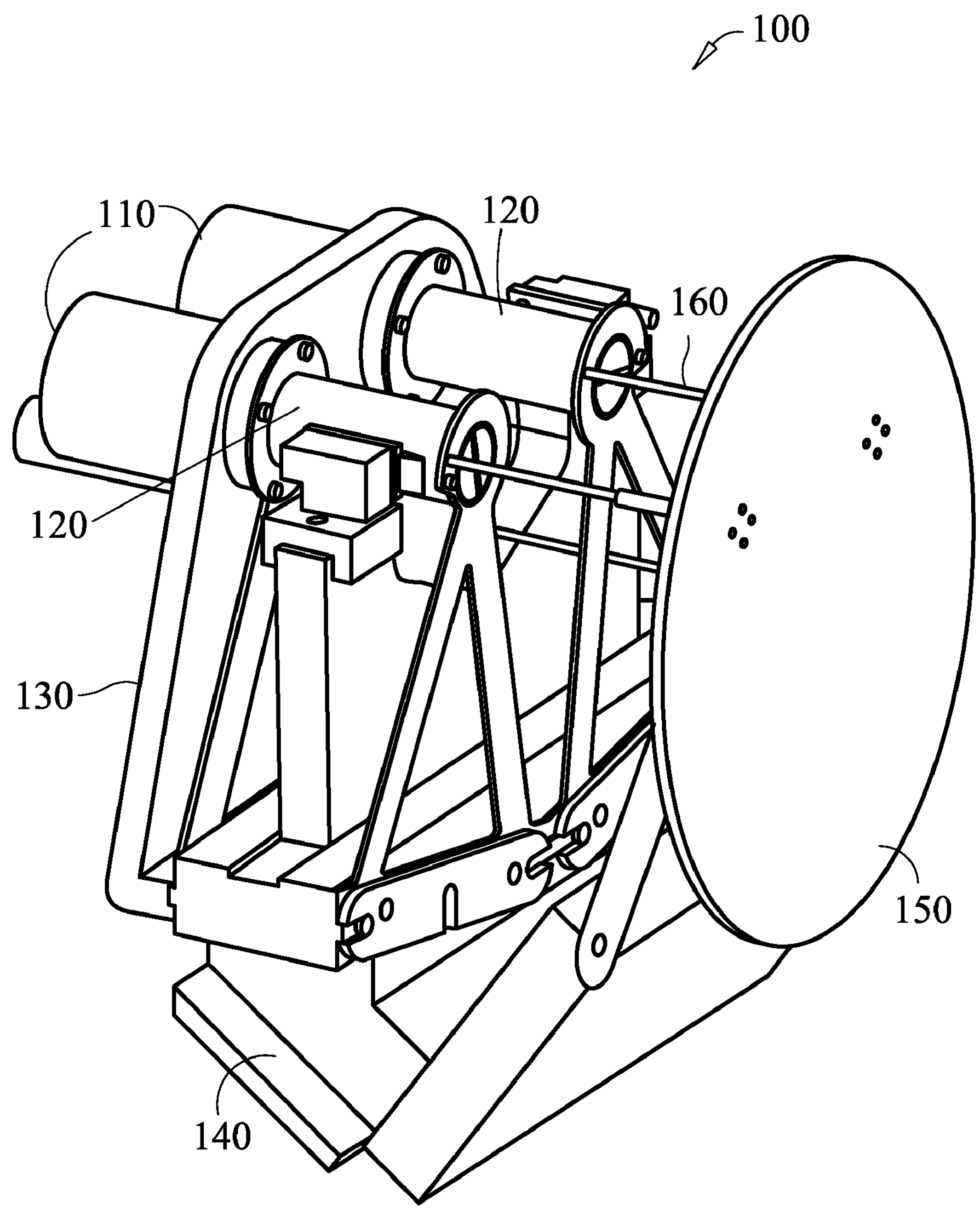
FIG. 2 is a left perspective view of an embodiment of the present invention.

FIG. 2 shows a left perspective view of mirror scanning system 100. First ends of actuator rod flexures 160 are attached to cylinders 120, while second ends of actuator rod flexures 160 are attached to the back side of mirror 150. As pair of voice coil actuators 110 are energized, pair of actuator rod flexures 160 simultaneously exert a force on mirror 150 causing deflection thereon.

Figure 3:
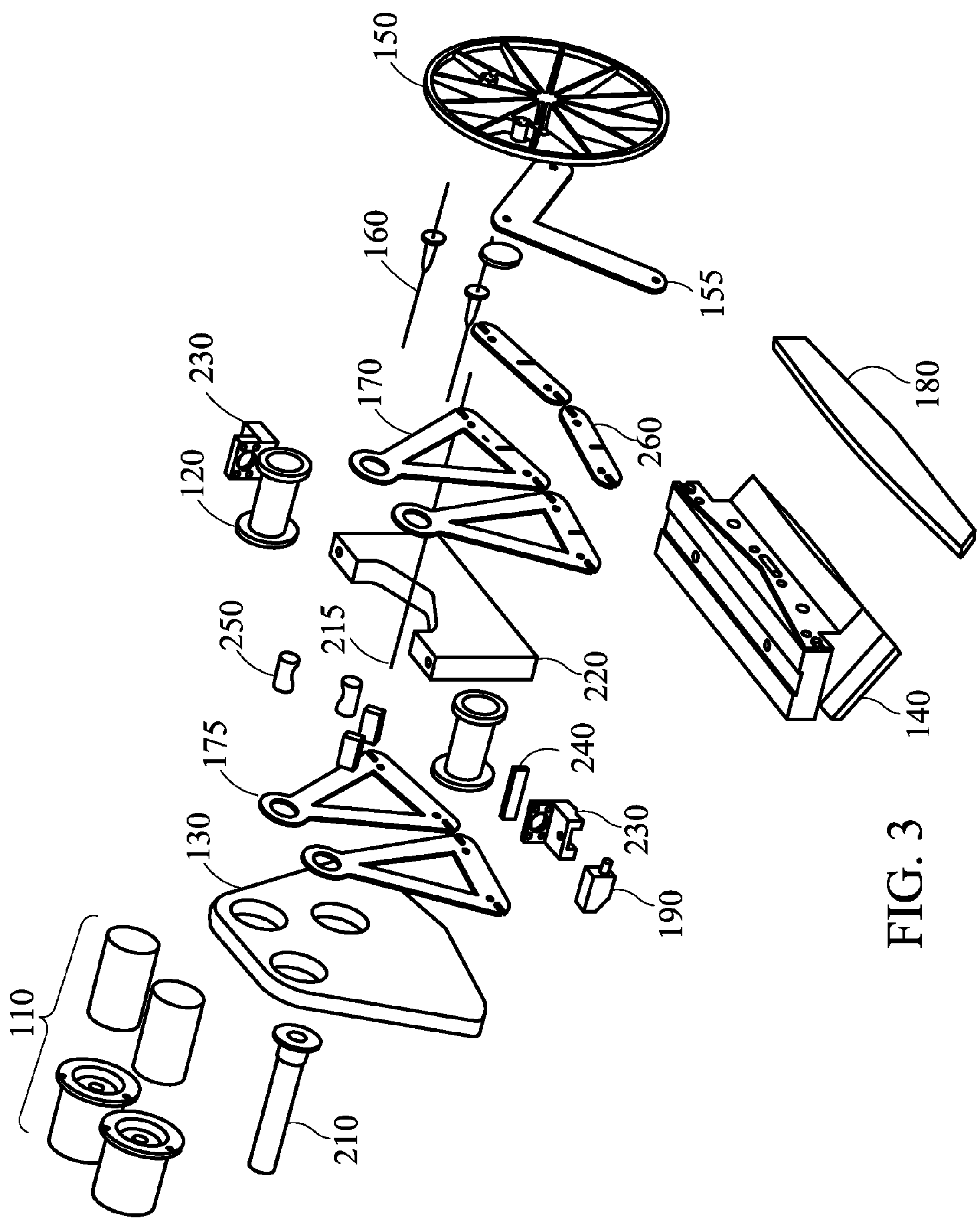
FIG. 3 is an exploded view of an embodiment of the present invention.

Referring now to FIG. 3 shows an exploded view of mirror scanning system 100. Pair of voice coil actuators 110 are comprised of an outer stationary cylindrical housing and an internal movable yoke that slides within the cylindrical housing. Center rod mount 210 is located below pair of voice coil actuators 110 and mounted to the front face of back plate 130, projecting rearward through the hole in back plate 130. The center rod 215 is secured to a center portion of mirror 150. A lower portion of front coil flexure 170 is secured to base 140 by base flexure mount 180. The upper portion of front coil flexure 170 is secured to the front portion of pair of cylinders 120. The upper portion of rear coil flexure 175 is secured to the rear portion of pair of cylinders 120. Accordingly, as voice coil actuators 110 are energized causing axial movement, rear coil flexure 175, pair of cylinders 120, pair of actuator rod flexures 160, and front coil flexure 170 all oscillate. Rear coil flexures 175 act in pairs to guide the voice coils of the voice coil actuators 110. However, neither the voice coil actuators 110 nor the actuator rod flexures 160 are in pairs so that everything attached to them may act independently. Stoppers 250 are mounted to the front portion of back plate 130 and are disposed so as to restrict the forward range of motion for pair of cylinders 120. The apex of inverted V-shaped mirror support flexure 155 is secured to the center of mirror 150 and the legs of mirror support flexure 155 are secured to base 140. Accordingly, mirror 150 is flexurally suspended.

A position sensor 190 is mounted to each sensor bracket 230, which is adjacent to each cylinder of pair of cylinders 120. Sensor 190 is used to determine precisely the axial positions of cylinders 120 and actuator rod flexures 160 and hence the angles of mirror 150. In the preferred embodiment, sensor 190 is a high-resolution glass scale position sensor. Scale 240 is mounted to cylinder 120 so that sensor 190 can determine the position of cylinder 120. In alternative embodiments, sensor 190 is a low-resolution metal scale sensor or a photo-reflective limit switch.

Figure 4:
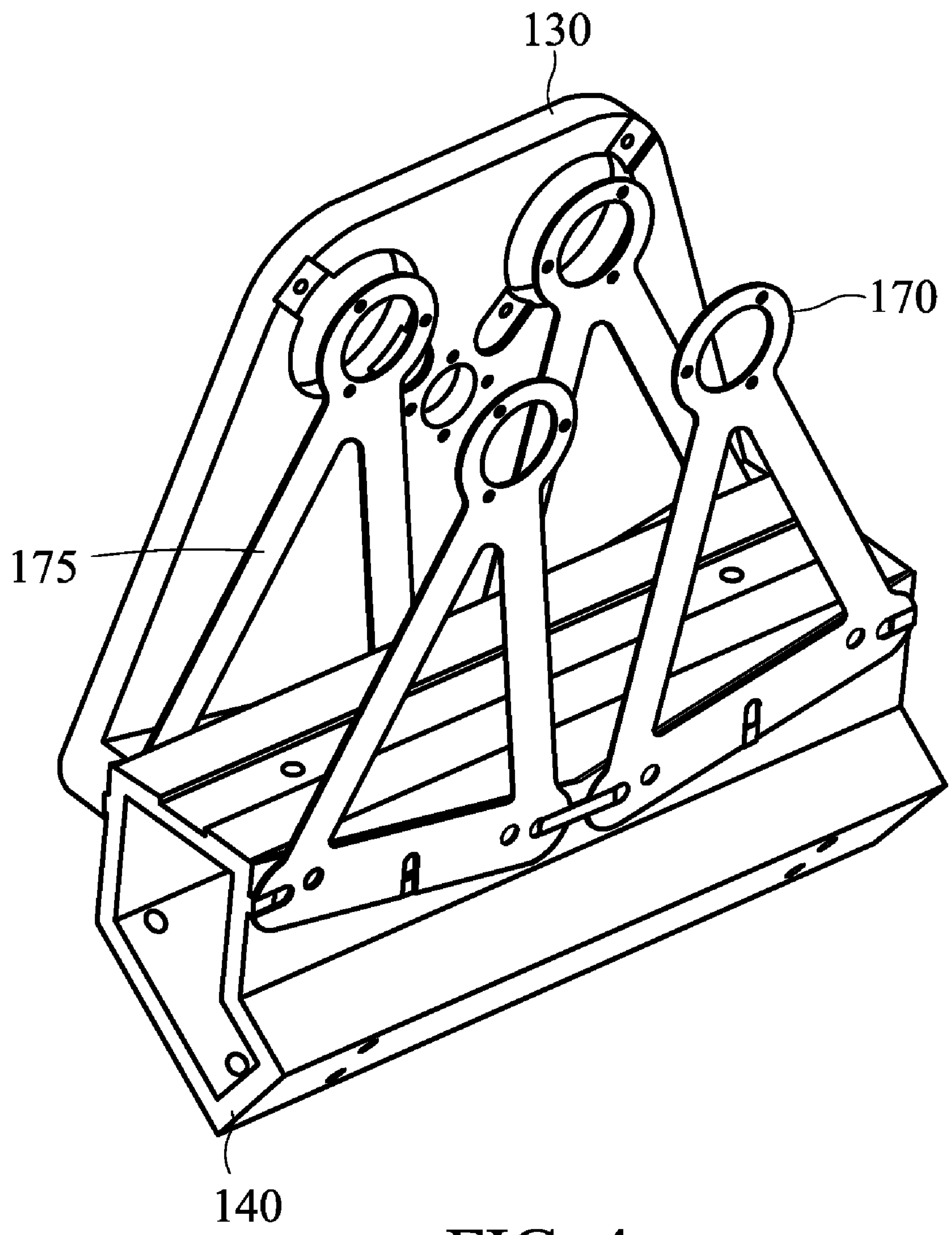
FIG. 4 is a perspective view of the voice coil flexure assembly in accordance with an embodiment of the present invention shown for clarity.

FIG. 4 is a perspective view of the coil flexure assembly wherein elements are removed for clarity. Lower portion of back plate 130 is mounted to base 140. Rear coil flexure 175 and front coil flexure 170 comprise triangular planar frames, which are flexible in the out-of-plane direction. There is an aperture at the apex of each triangular frame to allow a continuous path for the pair of rod flexures between the pair of corresponding voice coils and mirror. The periphery of the rear surface of each of the apexes of the rear coil flexure 175 is attached to the internal yoke of a corresponding voice coil, which passes through a corresponding aperture in back plate 130. A flange along the periphery of the rear surface of cylinder 120 is attached to the periphery of the front surface of each of the apexes of the rear coil flexure 175.

Figure 5:
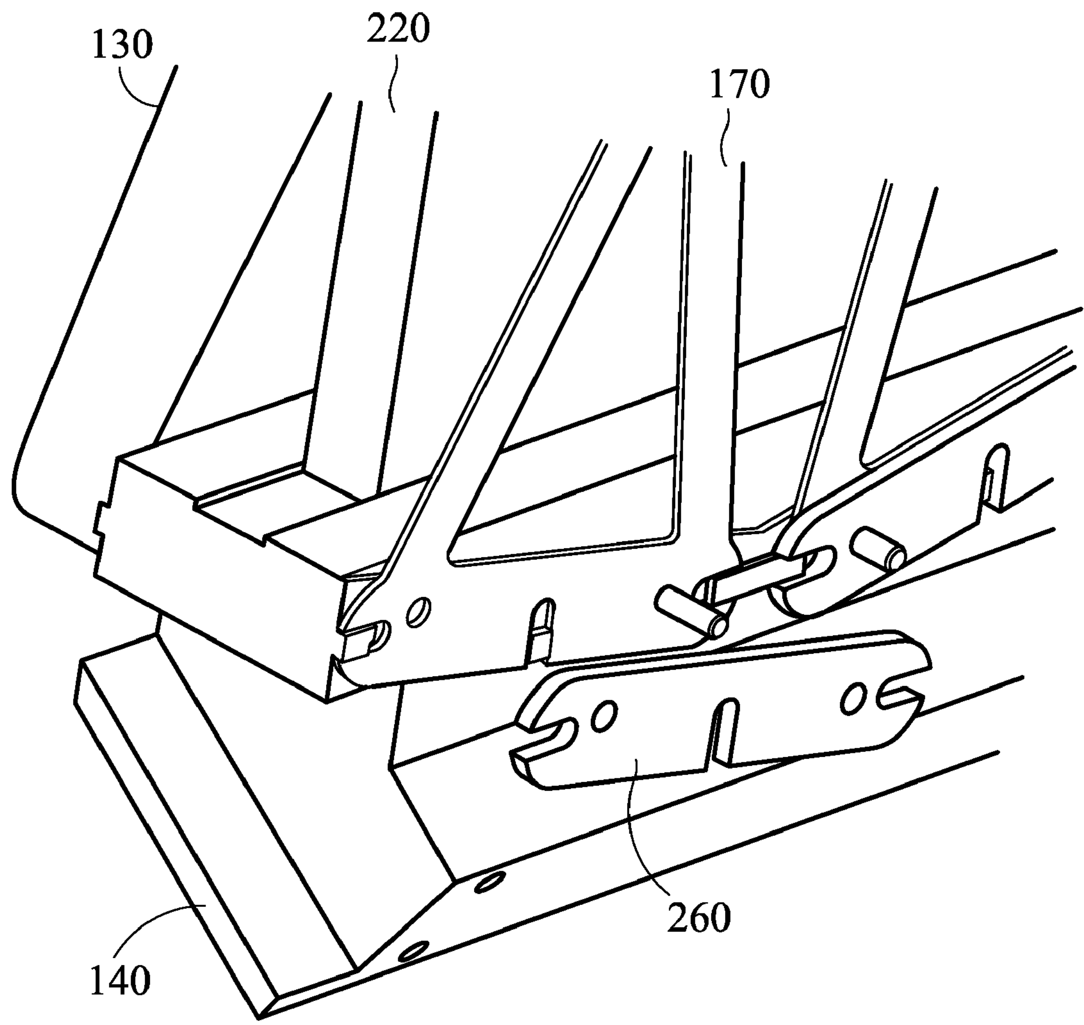
FIG. 5 is a partial exploded view of the bottom portion of a voice coil flexure assembly showing how it is mounted to the base assembly in accordance with an embodiment of the present invention.

The lower portion of front coil flexure 170 is attached to the front portion of base 140. Similar to rear coil flexure 175, front coil flexure 170 comprises a matching pair of apertures disposed at the apex of each triangular member. The pair of apertures allows a continuous path for pair of rod flexures between the pair of corresponding voice coils and the mirror. As shown in FIG. 5, the lower portion of front flexures 170 is secured to base 140 with clamp bar 260. A pair of opposing horizontal notches are disposed in the lower member of front coil flexure 170 and matching bosses are disposed on base 140. Bosses accurately locate front coil flexure 170 vertically, while the vertical notch on the lower member mates with the corresponding boss on base 140 to accurately locate front coil flexure 170 laterally.

Figure 6:
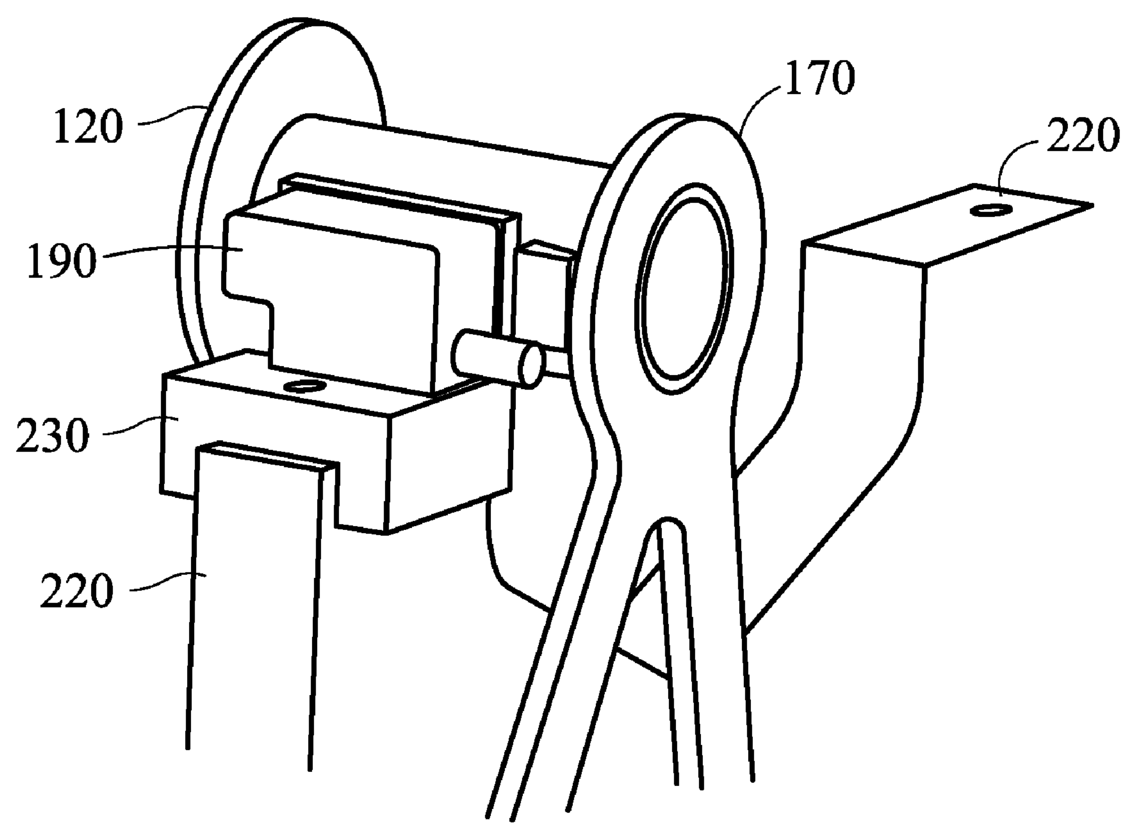
FIG. 6 is a partial view of the voice coil flexure and cylinder assembly in accordance with an embodiment of the present invention.

Referring now to FIG. 6, shows the upper portion of front flexure 170 attached to cylinder 120. Sensor mounting bracket 230 is attached to sensor bracket mount 220. Sensor 190 is supported on a top surface of mounting bracket 230. The rear portion of cylinder 120 has a circular flange about its periphery that is adapted to be secured to the internal yoke of the voice coil that moves cylinder 120 in an axial fashion which in turn moves rear coil flexure and front flexure 170 as the voice coil is intermittently energized.

Figure 7:
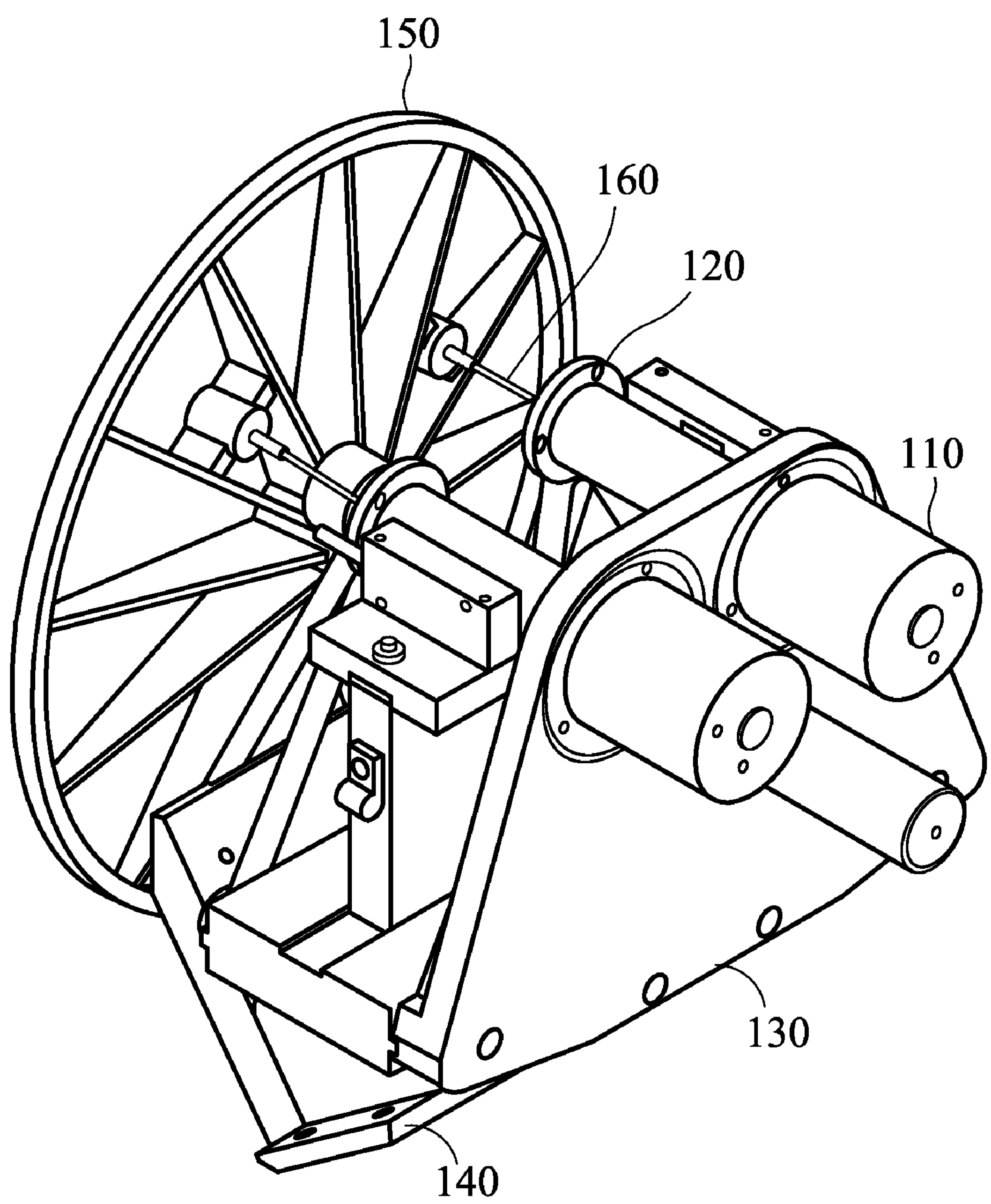
FIG. 7 is a rear perspective view of an embodiment of the present invention.

FIG. 7 shows a rear perspective view of mirror scanning system 100. Pair of actuator rod flexures 160 are attached to the rear portion of mirror 150. Mirror 150 is mounted resiliently and is deflected as force is applied by rod flexures 160.

Figure 10:
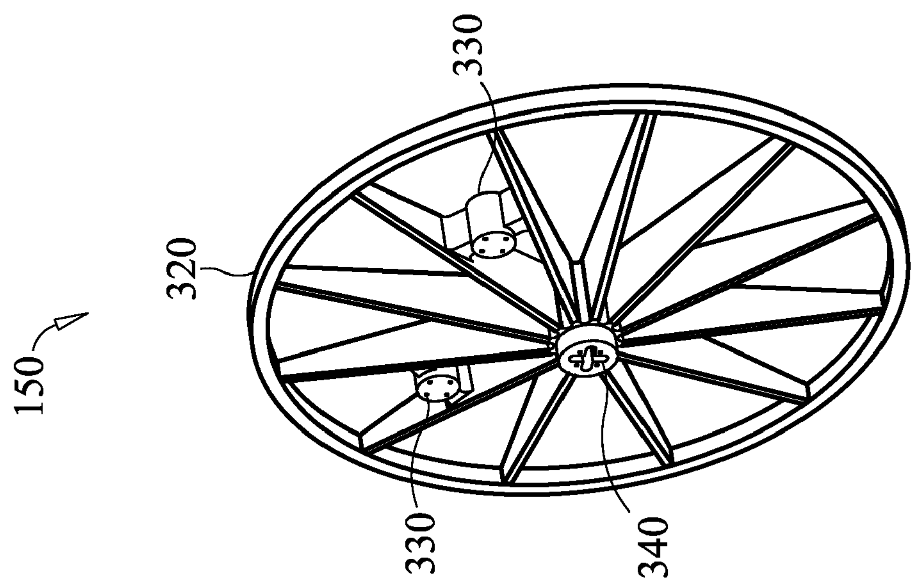
FIG. 10 is a rear perspective view of the mirror assembly in accordance with an embodiment of the present invention.
Figure 9:
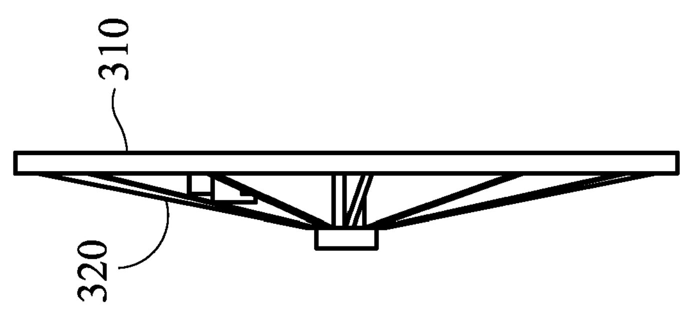
FIG. 9 is a side view of the mirror assembly in accordance with an embodiment of the present invention.
Figure 8:
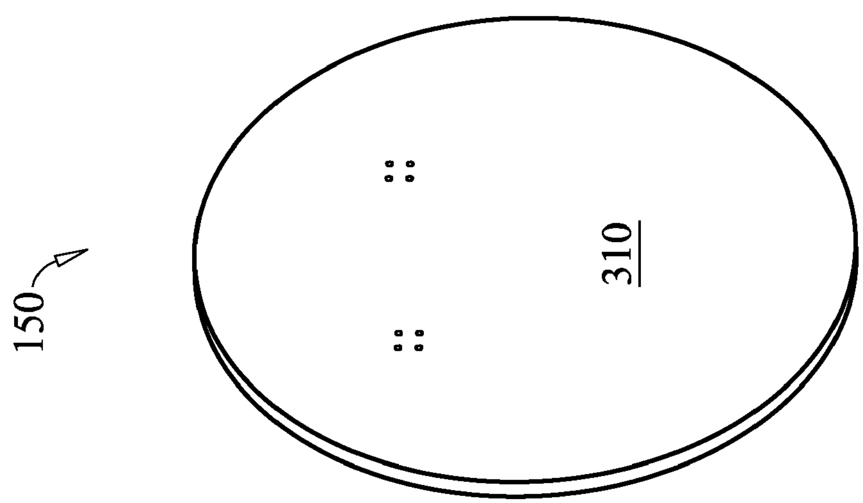
FIG. 8 is a front perspective view of the mirror assembly in accordance with an embodiment of the present invention.
Figure 11:
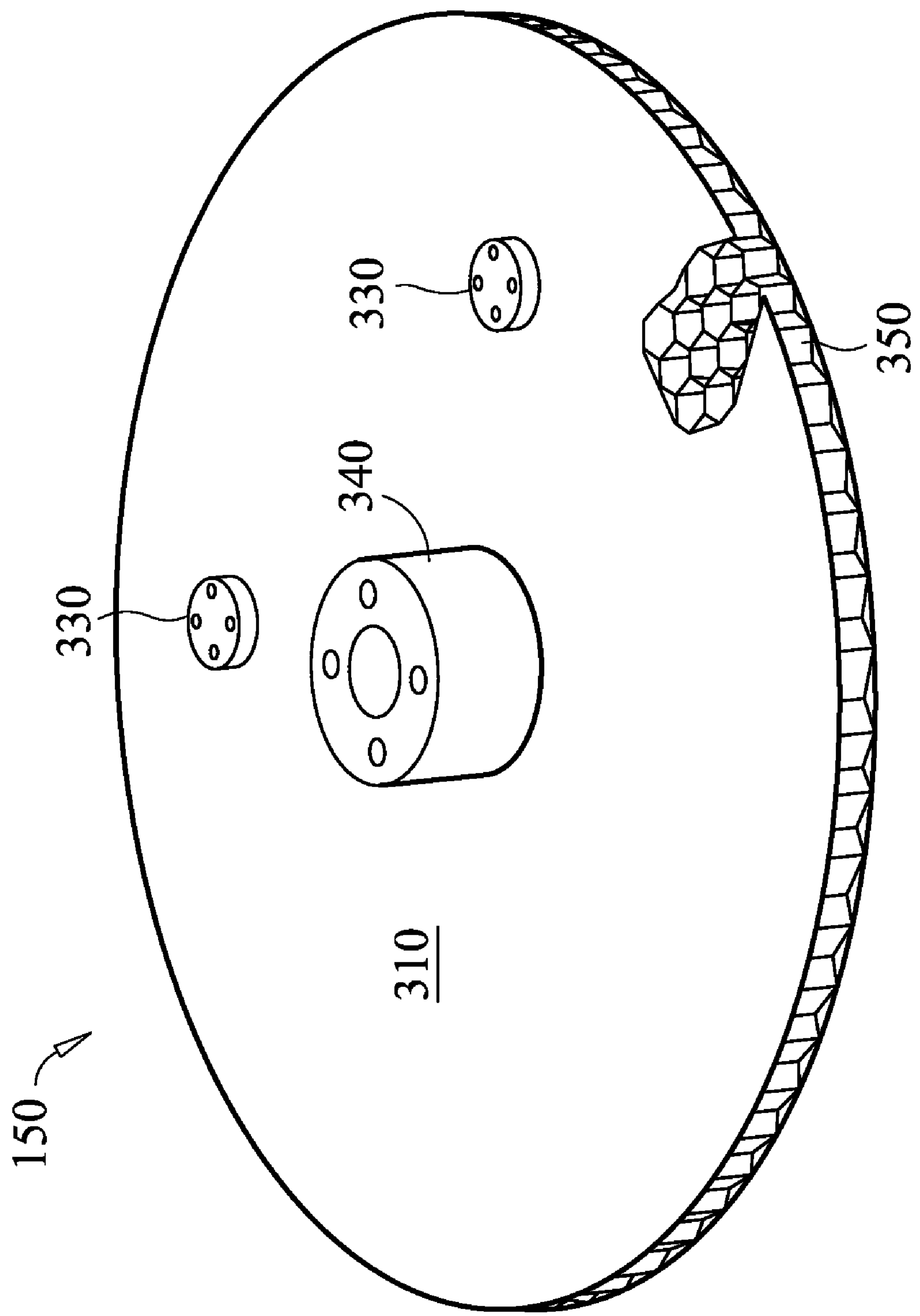
FIG. 11 is a partial view of the structure of the mirror assembly in accordance with an embodiment of the present invention.

FIG. 8 shows a front perspective view of mirror 150 having a reflective circular front surface 130. FIG. 9 is a side view of mirror 150 showing the structure supporting reflective front surface 130. Ribs 320 are disposed in radial fashion about the center location of mirror 150. As shown in FIG. 10, pair of mounting bosses 330 are used to secure pair of actuator rod flexures 160 to mirror 150. Center mounting boss 340 allows for the center rod 215 and V-shaped mirror support flexure 155 to be attached to mirror 150 and about which mirror 150 oscillates. FIG. 11 shows an alternative construction for mirror 150, using a honeycomb sandwich material for the primary mirror structure, with bosses 330 and 340 bonded to it for the attachment of actuator rod flexures 160 and 215. This construction is significantly lighter and cheaper than the machined construction.

The particular embodiments disclosed above and in the drawings are illustrative only, as the invention may be modified and practiced in different but equivalent manners apparent to those skilled in the art having the benefit of the teachings herein. Furthermore, no limitations are intended to the details of construction or design herein shown. It is therefore evident that the particular embodiments disclosed above may be altered or modified and all such variations are considered within the scope and spirit of the invention.

It is also to be understood that the following claims are intended to cover all of the generic and specific features of the invention herein described, and all statements of the scope of the invention, which as a matter of language, might be said to fall therebetween.

What is claimed is:

1. A mirror scanning system for use with a millimeter wave imaging system comprising:

a flexurally mounted mirror;

a pair of voice coil actuators aligned generally perpendicular to the mirror;

a pair of corresponding cylinders secured to a center yoke of each of the respective voice coil actuators of the pair of voice coil actuators having a circular flange disposed about the periphery of the pair of cylinders wherein the pair of cylinders oscillate as voice coils are intermittently energized pursuant to a predetermined frequency related to a desired resolution;

a base disposed generally parallel to the mirror to support a back plate that secures the pair of voice coils;

a pair of actuator rod flexures each having a first end secured to a center yoke of each of the respective voice coil actuators of the pair of voice coil actuators and a second end of each the pair of rod flexures secured to a back side of the mirror so that the pair of actuator rod flexures simultaneously exert a force on the mirror causing deflection thereon as the pair of voice coil actuators are energized;

wherein a lower portion of a front coil flexure is secured to the base by a base flexure mount;

wherein the front coil flexure further comprising an upper portion secured to a front portion of the pair of cylinders and an upper portion of the rear coil flexure is secured to a rear portion of the pair of cylinders so that as the pair of voice coils are energized causing axial movement, the rear coil flexure and front coil flexure move simultaneously;

a plurality of stoppers mounted to a front portion of the back plate and are disposed thereon to restrict the forward range of motion for the pair of cylinders;

a pair of position sensors mounted to a matching pair of sensor brackets disposed adjacent to each cylinder of the pair of cylinders so that each sensor can determine the exact location of the cylinder, and hence the angle of the mirror about the corresponding axis;

a scale mounted to each cylinder of the pair of cylinders so that each sensor can determine the position of each cylinder;

wherein the back plate further comprises a pair of apertures sized to receive the pair of voice coil actuators;

wherein the rear coil flexure further comprises a pair of resilient and adjacent triangular planar frames having an aperture at the apex of each triangular frame so that a continuous path is formed for the pair of rod flexures between the pair of corresponding voice coils and the mirror;

a flange along the periphery of the rear surface of each cylinder that is attached to the periphery of the front surface of each of the apexes of the rear coil flexure;

wherein the front coil flexure having a pair of triangular planar members that are restrained to move in both a lateral motion and the desired axial motion of the pair of rod flexures; the lower portion of the front coil flexure attached to the front portion of the base and a matching pair of apertures are disposed at the apex of each triangular member so that a continuous path for the pair of rod flexures is formed between the pair of corresponding voice coils and the mirror.

2. The mirror scanning system of claim 1 wherein the pair of position sensors is a high-resolution glass scale position sensor.

3. The mirror scanning system of claim 1 wherein the pair of position sensors is a low-resolution metal scale sensor.

4. The mirror scanning system of claim 1 wherein the pair of position sensors is a photo-reflective limit switch.

5. The mirror scanning system of claim 1 further comprising a pair of clamp bars for securing the lower portion of the front coil flexure to the base.

6. The mirror scanning system of claim 5, wherein the lower member of each of the pair of triangular members each further comprising a pair of opposing horizontal notches and matching bosses disposed on the base so that the front coil flexure moves laterally a predetermined distance.

7. The mirror scanning system of claim 6, wherein the lower member of each of the pair of vertical triangular members each further comprising a vertical notch and a matching boss disposed on the base to allow additional movement of the front coil flexure.

8. The mirror scanning system of claim 7 further comprising an inverted V-shaped mirror support flexure to stabilize the mirror about an axis.

9. The mirror scanning system of claim 6 wherein the mirror is comprised of a honeycomb material covered by a reflective surface on a front side.

10. A mirror scanning system for use with a millimeter wave imaging system comprising:

a flexurally mounted mirror;

a pair of voice coil actuators aligned generally perpendicular to the mirror;

a pair of corresponding cylinders secured to a center yoke of each of the respective voice coil actuators of the pair of voice coil actuators having a circular flange disposed about the periphery of the pair of cylinders wherein the pair of cylinders oscillate as voice coils are intermittently energized pursuant to a predetermined frequency related to a desired resolution;

a base disposed generally parallel to the mirror to support a back plate that secures the pair of voice coils; and a pair of actuator rod flexures each having a first end secured to a center yoke of each of the respective voice coil actuators of the pair of voice coil actuators and a second end of each the pair of rod flexures secured to a back side of the mirror so that the pair of actuator rod flexures simultaneously exert a force on the mirror causing deflection thereon as the pair of voice coil actuators are energized;

wherein a lower portion of a front coil flexure is secured to the base by a base flexure mount;

wherein the front coil flexure further comprising an upper portion secured to a front portion of the pair of cylinders and an upper portion of the rear coil flexure is secured to a rear portion of the pair of cylinders so that as the pair of voice coils are energized causing axial movement, the rear coil flexure and front coil flexure move simultaneously;

wherein the front coil flexure having a pair of triangular planar members that are restrained to move in both a lateral motion and the desired axial motion of the pair of rod flexures; the lower portion of the front coil flexure attached to the front portion of the base and a matching pair of apertures are disposed at the apex of each triangular member so that a continuous path for the pair of rod flexures is formed between the pair of corresponding voice coils and the mirror.

* * * * *